US007716489B1

(12) United States Patent
Brandt et al.

(10) Patent No.: US 7,716,489 B1
(45) Date of Patent: May 11, 2010

(54) ACCESS CONTROL METHOD FOR DISCONNECTED AUTOMATION SYSTEMS

(75) Inventors: David D. Brandt, Milwaukee, WI (US); Michael A. Bush, Hudson, OH (US); Brian A. Batke, Novelty, OH (US); Mark B. Anderson, Chapel Hill, NC (US); Jeffrey A. Shearer, North Royalton, OH (US); Craig D. Anderson, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1133 days.

(21) Appl. No.: 10/953,943

(22) Filed: Sep. 29, 2004

(51) Int. Cl.
*H04L 9/32* (2006.01)

(52) U.S. Cl. .................. 713/180; 726/27; 726/28; 726/29; 726/30

(58) Field of Classification Search .......... 713/182
See application file for complete search history.

(56) References Cited

U.S. PATENT DOCUMENTS

| 5,436,972 | A * | 7/1995 | Fischer ................. 380/286 |
| 5,604,914 | A * | 2/1997 | Kabe ...................... 710/1 |
| 5,848,231 | A * | 12/1998 | Teitelbaum et al. ......... 726/4 |
| 5,960,085 | A | 9/1999 | de la Huerga |
| 6,256,019 | B1 | 7/2001 | Allport |
| 6,581,161 | B1 * | 6/2003 | Byford .................... 713/182 |
| 6,813,641 | B2 * | 11/2004 | Fomenko et al. ........... 709/230 |
| 6,823,519 | B1 | 11/2004 | Baird et al. |
| 6,842,860 | B1 * | 1/2005 | Branstad et al. .......... 713/170 |
| 6,904,527 | B1 * | 6/2005 | Parlour et al. ............ 713/189 |
| 6,950,933 | B1 * | 9/2005 | Cook et al. ............... 713/158 |
| 6,977,576 | B2 | 12/2005 | Denison et al. |
| 2002/0006790 | A1 * | 1/2002 | Blumenstock et al. ....... 455/423 |
| 2002/0163920 | A1 * | 11/2002 | Walker et al. ............ 370/401 |
| 2004/0162996 | A1 * | 8/2004 | Wallace et al. ........... 713/201 |
| 2004/0203363 | A1 | 10/2004 | Carlton et al. |
| 2004/0210330 | A1 | 10/2004 | Birkle |
| 2005/0021712 | A1 | 1/2005 | Chassapis et al. |
| 2005/0229004 | A1 * | 10/2005 | Callaghan ................. 713/185 |
| 2005/0268334 | A1 | 12/2005 | Hesselink et al. |
| 2006/0010006 | A1 | 1/2006 | Kriedler et al. |
| 2006/0026672 | A1 * | 2/2006 | Braun ...................... 726/9 |
| 2006/0047830 | A1 * | 3/2006 | Nair et al. ................. 709/229 |

* cited by examiner

*Primary Examiner*—Kambiz Zand
*Assistant Examiner*—Dant B Shaifer Harriman
(74) *Attorney, Agent, or Firm*—Turocy & Watson LLP; R. Scott Speroff; John M. Miller

(57) ABSTRACT

A security system for disconnected automation devices comprises a central access control authority that provides access regulations that are received by a portable unit. An analysis component that determines whether access should be provided to a disconnected system based at least in part upon the access regulations. In accordance with an aspect of the present invention, for example, the access regulations can restrict access to a disconnected device for a particular timeframe.

34 Claims, 13 Drawing Sheets

ACCESS CONTROL METHOD FOR DISCONNECTED AUTOMATION SYSTEMS

TECHNICAL FIELD

The subject invention relates generally to industrial system automation, and more particularly to providing access control for disconnected automation system(s).

BACKGROUND OF THE INVENTION

Advancements in technology have enabled factory applications to become partially or completely automated. For example, applications that once required workers to put themselves proximate to heavy machinery and other various hazardous conditions can now be completed at a safe distance from such hazards. Further, imperfections associated with human action have been minimized through employment of highly precise machines. Many of these factory devices supply data related to manufacturing to databases that are accessible by system/process/project managers on a factory floor. For instance, sensors can detect a number of times a particular machine has completed an operation given a set amount of time. Further, sensors can deliver data to a processing unit relating to system alarms. Thus, a factory automation system can review collected data and automatically and/or semi-automatically schedule maintenance of a device, replacement of a device, and other various procedures that relate to automating a process.

Often, it is impractical to network each device in an automation system to a central facility/system. In other words, frequently several devices/systems employed in an automation context are disconnected from a centralized automation system. Particularly, automation systems that include security features can include a plurality of disconnected devices, wherein such devices are associated with security that either permits or denies access to a disconnected device. For instance, upon entering a correct username and password to a disconnected device, a technician or other user can obtain complete access to the disconnected device. These stand-alone control systems are typically distributed and can be isolated from any centralized supervision. Examples of these systems include portable batch machines, vending machines, door and lift controls for a vehicle (e.g., a bus, a subway car, . . . ), ski lifts, roller coasters, etc. To provide these systems with constant access to a network would be extremely costly. For instance, in the case of a vending machine at a particular geographic location, a substantial amount of cabling and/or expensive wireless peripherals would be required to enable constant network access to such machine. Similarly, structural issues arise when attempting to network all devices and/or systems utilized in a roller coaster and/or ski lift.

While it is often impractical to provide these and other similar devices with advanced networking capabilities, it is often imperative that these machines be associated with adequate security. For example, portable batch machines can be employed in connection with manufacturing a pharmaceutical, food product, and/or other ingestible item. Further, these portable batch machines can include a recipe that is employed in connection with manufacturing such ingestible items. Insufficient security could allow an unauthorized user to manipulate the recipe or data relating to the recipe within the batch machine, thus compromising safety of those who consume products manufactured based upon the recipe. In another example, insufficient security with respect to a roller coaster and/or ski lift can result in horrendous tragedy. For a specific example, if inadequate security exists with respect to a roller coaster, a technician can accidentally modify a control system with respect to speed control and/or braking. Particularly, a controller that is employed to control brakes at a particular curve can be accidentally manipulated, thereby turning off such brakes or providing insufficient braking. Accordingly, passengers of the roller coaster can be placed in extreme peril. Security is conventionally provided to such devices by implementing security-related functionality at time of manufacture of the disconnected devices. For instance, a vending machine can include data storage and processing capabilities, and user access requirements can be stored in the data storage. Specifically, a user-name and pin number can be required for a user who desires access to an infrastructure of the vending machine. Thereafter the technician can operate on disparate aspects of such vending machine without causing security features to trigger, such as generation of an alarm. Problems arise, however, when a new technician requires access to the vending machine and/or when a technician no longer desirably has access to such machine (e.g., the technician changes jobs, the technician's employment is terminated, the technician retires, . . . ). Accordingly, access privileges often require alteration to maintain security of a disconnected device and/or system.

Conventional security systems require a security technician to travel to individual machines to alter security regulations. Thus, for instance, if a technician whose employment was terminated had access to a plurality of disconnected devices in a geographic region, each of the disconnected devices must be visited to alter access privileges. This individual alteration is costly in terms of both monetary expense and time-loss of a qualified technician. Specifically, both money and resources are spent during a technician's visit to a plurality of disparate locations in order to maintain security of the disconnected devices. Further, there is a storage burden relating to these disconnected devices, wherein sufficient data storage capabilities are required to retain access information for each individual who is authorized to access the system/device.

In view of at least the above, there exists a need in the art for a system and/or methodology for providing an efficient security system with respect to disconnected devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention facilitates centrally providing security rules and regulations to one or more disconnected systems, and thus provides various improvements over conventional security systems with respect to disconnected systems. Particularly, utilizing the subject invention, modifications to access privileges for particular user(s) can be made a single time at a central access control authority, rather than requiring a technician to modify user access rights with respect to a plurality of disparate disconnected systems. The subject invention utilizes a central access control authority to provide access rights and regulations regarding one or more disconnected systems. These access rights can be transferred to a portable unit, such as a Smart Card, a PDA, a laptop computer, or any other suitable portable unit, which can thereafter be presented to disconnected devices within an industrial system. The portable unit can receive the access regulations and rights from the central access control authority via any suitable manner. For instance, the portable unit can be connected to the central access control authority through an access port (e.g., a serial port, a USB port, . . . ), wireless via a transmitter and receiver, through an infrared link, over a network, etc. This transfer can be secure from tampering by the operator or external source through a combination of link security or transfer protocol security. The portable unit can then cache these regulations and rights and be physically transferred proximate to the disconnected device to enable access to such device.

The disconnected system can include an analysis component that reviews the access regulations and rights cached within the portable unit and determines whether an operator associated with such unit is to be granted access to the disconnected system. For instance, access regulations cached within the portable unit can restrict access to the disconnected system to a limited timeframe. For instance, the central access control authority and the disconnected system can be synchronized, thereby enabling the disconnected system to analyze the timeframe relative to the central access control authority. In accordance with another aspect of the subject invention, the portable unit can include a clocking mechanism that limits a time in which access can be allowed to the disconnected system. For a particular example, the access regulations provided by the central access authority can restrict access time to an eight-hour period. The portable unit, upon receiving the access regulations, "counts down" from eight hours. If access to the disconnected system is requested after the eight-hour period, the requested access will be denied. Furthermore, the access regulations can include data that indicates an origin of the access regulation, tampering indicia, ownership information, specific tasks allowed upon access, and any other suitable information that may be pertinent to allowing access to a disconnected system. Thereafter, the analysis component associated with the disconnected system can review the above information and determine whether access should be allowed to such disconnected system.

In accordance with one aspect of the subject invention, the access regulations can be in a form of a structured document and/or certificate, such as a public key infrastructure document and/or a Kerberos ticket (as well as any other suitable structure). The structured data can include information relating to user access rights (e.g., specific tasks a user is authorized to undertake given access to a disconnected system). Thus, the disconnected system can provide the user with restricted access. Further, the data structure can include origination information that indicates that the data structure has been provided by a trusted party (e.g., a central access control authority). Moreover, the data structure can include information that can be analyzed in connection with determining whether the data structure has been subject to tampering. The data structure can also include user identity information, wherein a user should provide information that substantially matches the information within the data structure (e.g., PIN, password, biometric data, . . . ). Information relating to access expiration (e.g., a timeframe of allowed access) can further be provided within the data structure. In accordance with another aspect of the present invention, sequencing information can be provided within the data structure, wherein a sequence of access can be enforced in connection with enabling access to a disconnected system.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
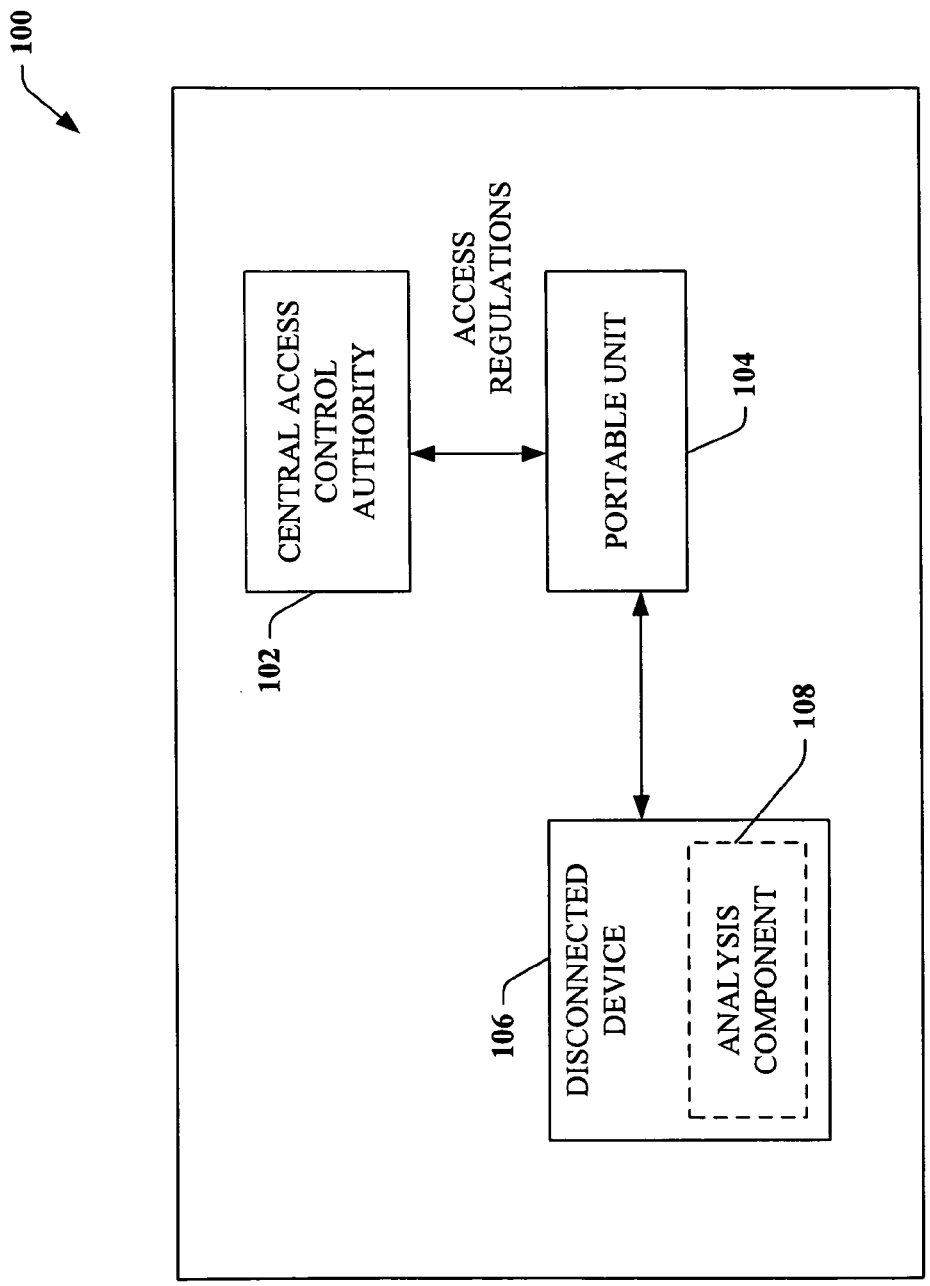
FIG. 1 is a high-level block diagram of a system that facilitates centrally providing access regulations relating to one or more disconnected systems/devices in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with an aspect of the subject invention. The subject invention relates to a novel system 100 that facilitates centrally providing access rights to devices that are disconnected from a central authority and optionally other devices an automation system, either temporarily or permanently. The system 100 includes a central access control authority 102 that is employed to provide access regulations to disconnected devices managed by such central access control authority 102. For example, the central access control authority 102 can provide access rights that relate to user identity, particular disconnected device(s), timeframe of available access, extent of access rights, and any other suitable parameters that can be related to accessing a disconnected system/device. Furthermore, while the central access control authority 102 is shown as a single system, it is understood that such control authority 102 can be a distributed system that is interconnected to act as a single system.

The access regulations provided by the central access control authority 102 can be received by a portable unit 104 that connects to the central access control authority 102. The portable unit 104 can be configured to physically interconnect with the central access control authority 102, or in a variation of the subject invention can connect through a network. The portable unit 104 should have sufficient memory to at least temporarily cache the access regulations. In accordance with one aspect of the subject invention, the portable unit can be a disk, a Smart Card, a Flash memory storage token, a PDA, a laptop, a cellular phone, or essentially any other similar device. For example, the access regulations can be delivered from the central access control authority 102 to the portable unit via an access port such as a USB port, a disk drive, an infrared data stream, a conventional wireless transmission, or any other suitable manner. The portable unit 104 can also receive additional data from the central access control authority 102. For instance, the portable unit 104 can receive operating instructions and other similar data that is not directly pertinent to accessing a disconnected device.

The operating instructions in the portable unit 104 can then be transferred by a user to a disconnected device 106, wherein the stored access regulations are utilized to obtain a granted level of access relating to the user and/or the disconnected device 106. For one simplistic example, the access regulations received by the portable unit 104 from the central access control authority 102 can desirably grant access to the disconnected device 106 to a certain set of operators who are knowledgeable of a personal identification number (PIN). Thus, the portable unit 104 can transfer these access regulations to the disconnected device 106, thereby providing the disconnected device 106 with centrally administered security regulations. In accordance with the above example, the disconnected device 106 can then query an operator for the specified PIN number, and operators aware of such PIN numbers are provided access to the disconnected device.

The disconnected device 106 can further include an analysis component 108 to analyze access regulations and other data provided to the disconnected device 106 from the central access control authority 102 via the portable unit 104. For instance, if the access regulations indicate that a user associated with the portable device 104 is only authorized to perform particular tasks, the analysis component 108 can review the access regulations and determine which tasks the user is authorized to undergo. Further, the analysis component 108 can be employed to authenticate contents of the access regulations as well as other data provided to the disconnected device 106 via the portable unit 104. Specifically, the analysis component 108 can determine whether the access regulations originated from the central access control authority 102, or whether a user has manipulated and/or generated access regulations. Further, the analysis component 108 can be employed in connection with prompting the user for user identification information, such as biometric information, username, password, etc. For example, the analysis component can employ fingerprint analysis, voice recognition, facial feature recognition, and the like in connection with authenticating an identity of a user associated with the portable unit 104. As stated above, conventional user names, passwords, PINs, and the like are also contemplated by the subject invention.

In accordance with another aspect of the subject invention, the access regulations provided by the central access control authority 102 can relate to more than one user. For instance, while a single user may be associated with the portable unit 104, the access regulations transferred from the portable unit 104 to the disconnected device 106 can include access regulations relating to a plurality of users. Therefore, security relating to the disconnected device 106 is updated with respect to the plurality of users by the central access control authority 102 each time the disconnected device 106 is accessed. In accordance with another aspect of the subject invention, the access regulations can be valid within the portable unit 104 for a particular period of time and/or a particular number of accesses prior to requiring updating from the central access control authority 102. Thus, access rights related to a user and/or the portable unit 104 can be required to be updated after expiration of such time and/or upon occurrence of a pre-defined number of accesses. Further, access relating to the disconnected device 106 can be mandated to occur in a particular sequence (e.g., a first portable unit must access the disconnected device first, followed by a disparate portable unit). Therefore, the central access control authority 102 can control which users are authorized access to particular disconnected devices at specific times.

In accordance with another aspect of the subject invention, the access regulations created by the central access control authority 102 can be encrypted to allow only the disconnected device 106 to which access is desired to decrypt the access regulations. In particular, the access regulations can include cryptographic keys. For one specific example, user keys can be generated and included within the access regulations together with the access restrictions. Thereafter, such keys and access restrictions can be hashed by employing a cryptography hashing function, such as MD5, SHA-1, RIPEMD-160, or any other suitable hashing function. The hash can thereafter be signed through utilization of one or more private key(s) associated with the central access control authority 102. An encrypted session key can also be commissioned with the access regulations. The encrypted access regulations, including private keys, session keys, and the signature from the central access control authority 102 can then be parsed by the disconnected device 106, which can decrypt the session key. The disconnected device 106 will know of the corresponding hashing function, and can thus decrypt the access regulations and apply them therein. Such security may be imperative in view of hackers that can attempt to modify access rights as they are in transport on the portable unit 104. Thus, the access regulations while upon the portable unit 104 will be indecipherable to an individual who carries such unit. While the above illustrates one method of providing cryptographic security relating to the access regulations, any suitable manner of encrypting and decrypting the access regulations securely is contemplated by the inventors of the subject invention and intended to fall under the scope of the heretoappended claims.

The system 100 offers various improvements over security systems with respect to disconnected devices. Particularly, access regulations relating to a plurality of disconnected devices can be updated via the central access control authority 102, rather than requiring visitation to each disconnected machine to update security upon alterations with respect to user access privileges. Further, by employing a timing mechanism with respect to the access regulations and the portable unit 104, a technician will not be able to gain uninhibited access to the disconnected device 106. Thus, implementing the system 100 will save money and resources within an automation environment. Moreover, when the portable unit 104 is connected to the central access control authority 102, access regulations associated with the portable unit 104 (and the user employing the portable unit 104) can be checked for accuracy and/or modified with essentially no delay.

Figure 2:
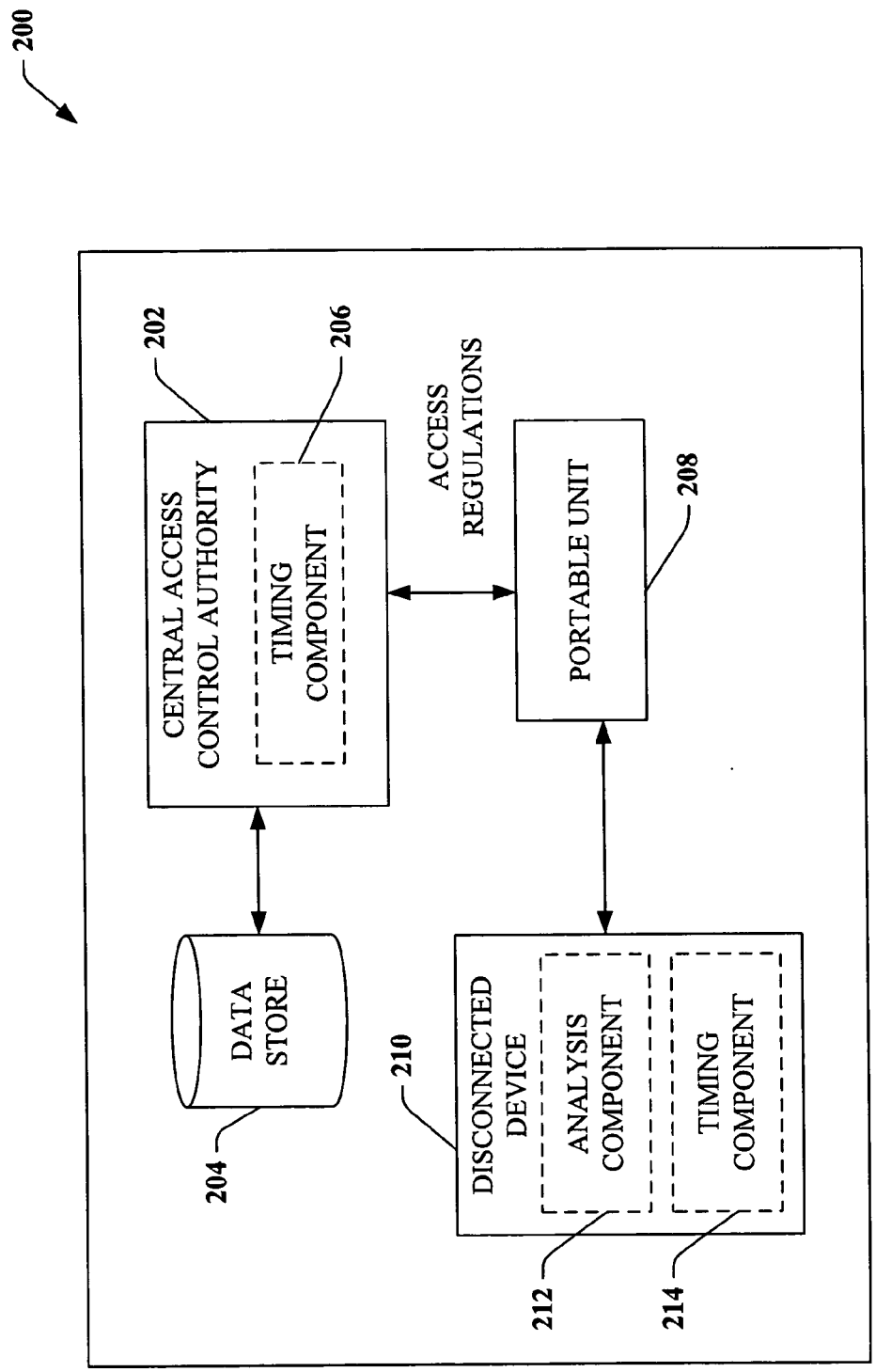
FIG. 2 is a block diagram of a system that facilitates analysis of centrally provided access regulations by a disconnected system/device in accordance with an aspect of the subject invention.

Turning now to FIG. 2, a system 200 that facilitates centrally managing security relating to disconnected device(s) is illustrated. The system 200 includes a central access control authority 202 that provides access regulations relating to one or more disconnected device(s). The central access control authority 202 can employ a data store 204 to store and/or retrieve access regulations as well as other data relating to an industrial automation system. Furthermore, the data store 204 can include either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 204 of the system 200 is intended to comprise, without being limited to, these and any other suitable types of memory and/or data storage devices.

The central access control authority 202 also includes a timing component 206, which facilitates generating time limits that are associated with the provided access regulations. For instance, a time stamp, sequence number, or the like can be associated with the access regulations provided by the central access control authority 202. The access regulations can further include one or more user identities that are authorized to access disparate disconnected devices, data that is employed to validate contents of the access regulations, data that is employed for origination checks of the access information, and any other suitable information that can be employed in connection with providing security to disconnected device(s). A portable unit 208 that is associated with one or more users connects to the central access control authority 202 and receives the access regulations. The portable unit 208 can include processing capabilities as well as sufficient memory to retain the access regulations. Furthermore, the portable unit 208 can deliver data to the central access control authority 202 when connected thereto. For instance, the portable unit 208 can retain audit information relating to one or more disconnected automation devices 210 (e.g., a batch manufacturing device). The audit information can include identities of users who accessed a device, time of access, action undertaken upon the device, and the like. Other suitable data can also be related from the portable unit to the central access control authority 202.

The portable unit 208 can then be coupled to a disconnected device to which access is desired. For instance, the portable unit can be electrically coupled to the disconnected device 210, thereby enabling transfer of the access regulations relating to the portable unit 208 to the disconnected device 210. Particularly, connecting via access ports of the portable unit 208 and the disconnected device 210 can facilitate transfer of access regulations therebetween. In a disparate embodiment, the portable unit 208 can communicate the access regulations to the disconnected device 210 through conventional wireless communication techniques, through an infrared light emitted from the portable unit 208 and received by the disconnected device 210, through a barcode and barcode scanner, through a magnetic stripe reader, or any other suitable manner of transmitting the access regulations from the portable unit 208 to the disconnected device 210 when the portable unit 208 is proximate thereto.

The disconnected device 210 includes an analysis component 212 for analyzing the access regulations proffered to the disconnected device 210 via the portable unit 208. For example, the analysis component 212 can determine whether the access regulations originate from the central access control authority 202, whether the portable unit 208 has been subject to tampering, whether the access regulations are valid, which actions are allowable with respect to an operator associated with the portable unit 208, etc. Further, the analysis component 212 can operate in conjunction with a timing component 214 to determine whether the access regulations are valid. For example, the central access control authority 202 and the disconnected device 210 can be synchronized by utilizing the timing components 206 and 214. For instance, the portable unit 208 can include an internal timer (not shown), and receive a time from the central access control authority 202. Thereafter, the portable unit 208 can inform the timing component 214 of the disconnected device 210 of the time of the central access control authority 202. Thereafter, the central access control authority 202 and the disconnected device 210 will be approximately synchronized. Furthermore, synchronization can be maintained by consistent use of a portable unit that includes an internal timing mechanism. Therefore, the access regulations provided to the portable unit 208 can provide a valid timeframe for access. Thereafter, the portable unit 208 can attempt to access the disconnected device 210, wherein the analysis component 212 and the timing component 214 will determine whether the allocated time for access has expired. Any other suitable time synchronization method may be employed, including Global Positioning System (GPS) based time or radio station broadcast time sources typical of usage in wristwatches and wall clocks.

In accordance with one exemplary implementation, the time source is secure from tampering.

In accordance with a disparate aspect of the subject invention, the access regulations can include sequence information, and the timing component 214 of the disconnected device 210 can facilitate validating the sequence. In particular, the central access control authority 202 and the disconnected device 210 can follow a sequence known only to the central access control authority 202 and the disconnected device 210. Each access requires a data pattern within the access regulations to be disparate from a previous pattern, wherein the data pattern differences are based upon the sequence. For instance, this sequence scheme can be employed to enforce one-time access with respect to the disconnected device 210. Furthermore, the access regulations can include a timeframe for access upon request for such access. For instance, an operator associated with the portable unit 208 can be granted access to the disconnected device 210 based at least in part upon the access regulations. Encoded within the access regulations can be a timeframe during which the operator can have access to the disconnected device 210. Therefore, upon granting of access to the operator, the timing component 214 can open a timeframe for access in accordance with the timeframe in the regulations. This particular aspect can allow an operator to lock and unlock the disconnected device 210 over a limited time period to complete such tasks as power cycles. Further, the timing component 214 is not required to include a real-time clock as is required for synchronization, but rather can employ a relative time base that is readily available and inexpensive.

As stated above, the analysis component 212 can further challenge an operator associated with the portable unit 208 to provide proof of identification. For instance, an operator can be prompted to enter user-related information directly into the disconnected device via a keypad, biometric interface, or the like. Further, it is to be understood that multiple portions of identity information can be required prior to allowing an operator access to the disconnected device. Thus, the analysis component 212 can essentially determine whether the access regulations within the portable unit 208 provide access rights to one or more operators, can authenticate an identity of the operator, and determine whether the access is within a granted timeframe.

Figure 3:
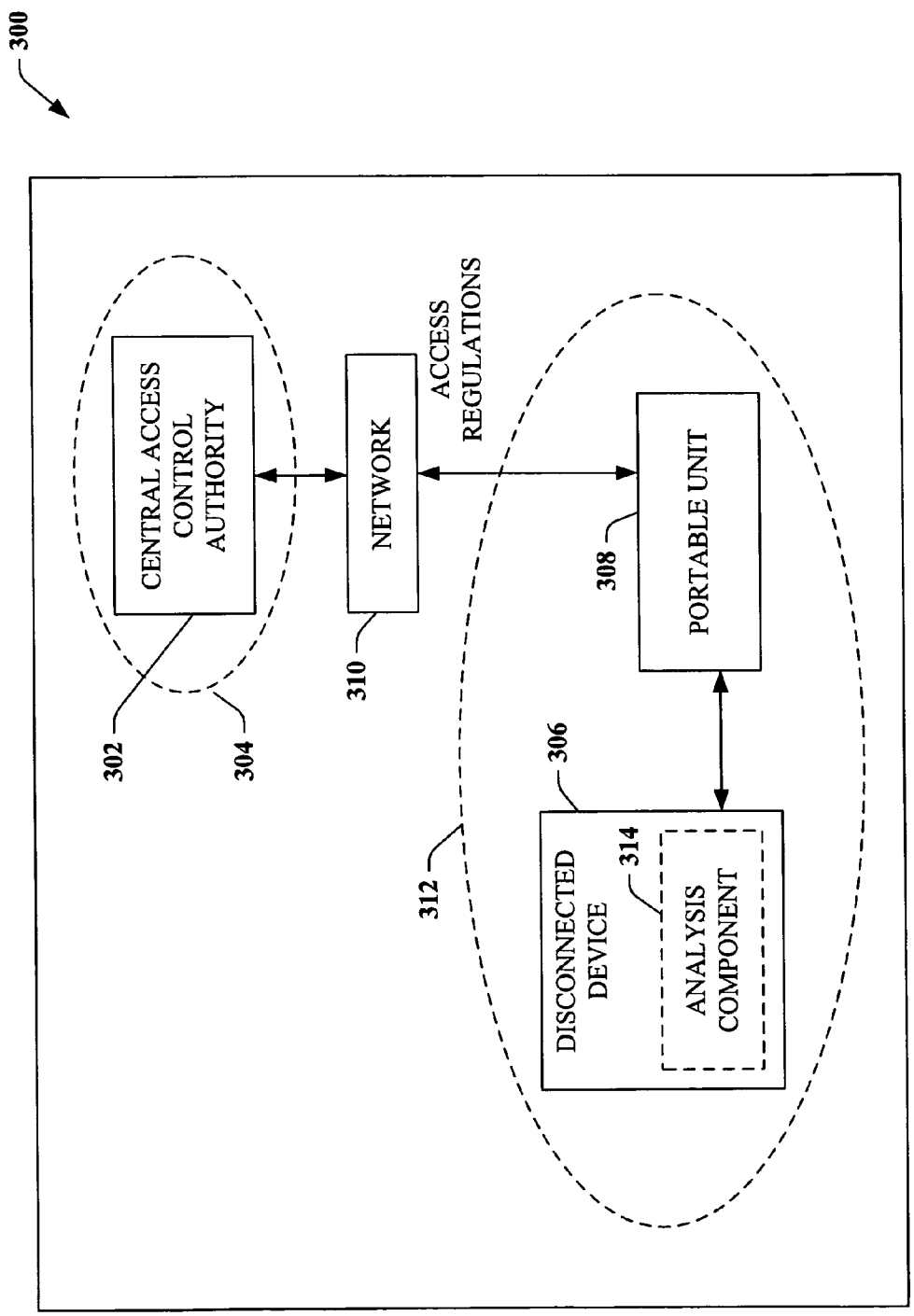
FIG. 3 is a block diagram of a system that facilitates delivering centrally provided access rights to one or more disconnected systems/devices in a disparate geographic region in accordance with an aspect of the subject invention.

Turning now to FIG. 3, a system 300 that facilitates centrally providing security information relating to an automation system to one or more disconnected devices is illustrated. The system 300 further enables a disconnected device to be secured by a central security system even when the device and the security system are geographically separated by a substantial distance. The system 300 includes a central access control authority 302 that exists at a first geographic region 304. The central access control authority 302 provides access regulations that are employed in connection with a disconnected device 306. The central access control authority 302 communicates access regulations relating to the disconnected device 306 to a portable unit 308 through a network 310, wherein the disconnected device 306 and the portable unit 308 are located at a second geographical location 312. This transfer can be secure from tampering by the operator or external source through a combination of network security or transfer protocol security. The network 310 can be, for example, a Wide Area Network such as a satellite, modems, cellular networks, and/or local Internet connections. Furthermore, the portable unit 308 can receive the access regulations through a trusted chain of computing devices. For one particular example, the portable unit 308 can be a disk. Thus, a trusted computer proximate to the disconnected device 306 can receive the access regulations, and thereafter pass such access regulations to the portable unit 308 (e.g., the disk). As described above, in accordance with one aspect of the subject invention, the computer can be viewed as a portion of the central access control authority 302 (e.g., the central access control authority 302 is a distributed system acting as a single system).

The central access control authority 302 can take a plurality of suitable forms. For instance, a traditional Certificate Authority is one example. A Certificate Authority is an entity that issues digital identity certificates for employment by other parties, and is an example of a trusted third party. Such Certificate Authorities are characteristic of many Public Key Infrastructure (PKI) schemes. A PKI is employed for authentication purposes, and enables users/devices to utilize information in certificates to encrypt and decrypt messages traveling between devices/systems. Certificate Authorities issue a public key certificate, wherein the certificate states that the Certificate Authority attests that such public key within the certificate belongs to a noted owner within such certificate. Therefore, a Certificate Authority can be utilized in connection with the central access control authority 302 to verify that access regulations (e.g., in a form of PKI certificates) belong to the portable unit 308, the central access control authority 302, and/or the disconnected device 306 (and/or operators associated therewith). In accordance with another aspect of the subject invention, the access regulations can be included within one or more Kerberos tickets and associated structures. Kerberos is a computer network authentication protocol designed for utilization on insecure networks (e.g., the Internet). Kerberos allows user/systems/devices that communicate over the network 310 to prove identity to each other while further preventing eavesdropping or replay attacks, and provides for detection and/or modification. Further, Kerberos can be employed to prevent unauthorized reading. Moreover, Pretty-Good-Privacy (PGP) can also be employed in connection with delivering access regulations from the central access control authority 302 to the disconnected device 306 via the portable unit 308. PGP is a program that provides cryptographic privacy and authentication. Thus, utilizing PGP, a distributed web of trust can be built between devices within the central access control authority 302, as well as between the central access control authority 302, the portable unit 308, and the disconnected device 306. While the above illustrates particular certificate and/or networking protocols, it is to be understood that any suitable configuration and transfer of the access regulations between the central access control authority 302, the portable unit 308, and the disconnected device 306 is contemplated by the inventors of the subject invention, and intended to fall under the scope of the hereto-appended claims.

The central access control authority 302 delivers the access regulations to the portable unit 308 via the network 310 in accordance with selected security and authentication protocols/configurations. The access regulations can be in a form of a digital document, or any other suitable structure. Upon receiving and caching the access regulations, the portable unit 308 is transferred and connected to the disconnected device 306. The term "connection" can refer to a physical connection and/or a non-physical connection, so long as such portable unit 308 can communicate with the disconnected device 306. The disconnected device 306 includes an analysis component 314 that analyzes the access regulations proffered by the portable unit 308. For example, the analysis component 314 can determine whether the access regulations have been delivered within a requisite timeframe, whether the access regulations have been subject to tampering, whether the access regulations originate from within the central access control authority 302, and the like. Further, the analysis component 314 can challenge an operator for identity information (e.g., password, PIN, biometric information, . . . ). Upon determining validity of the access regulations and associated parameters, the analysis component 314 can provide an operator utilizing the portable unit 308 with access to the disconnected device 306 according to the access regulations.

Figure 4:
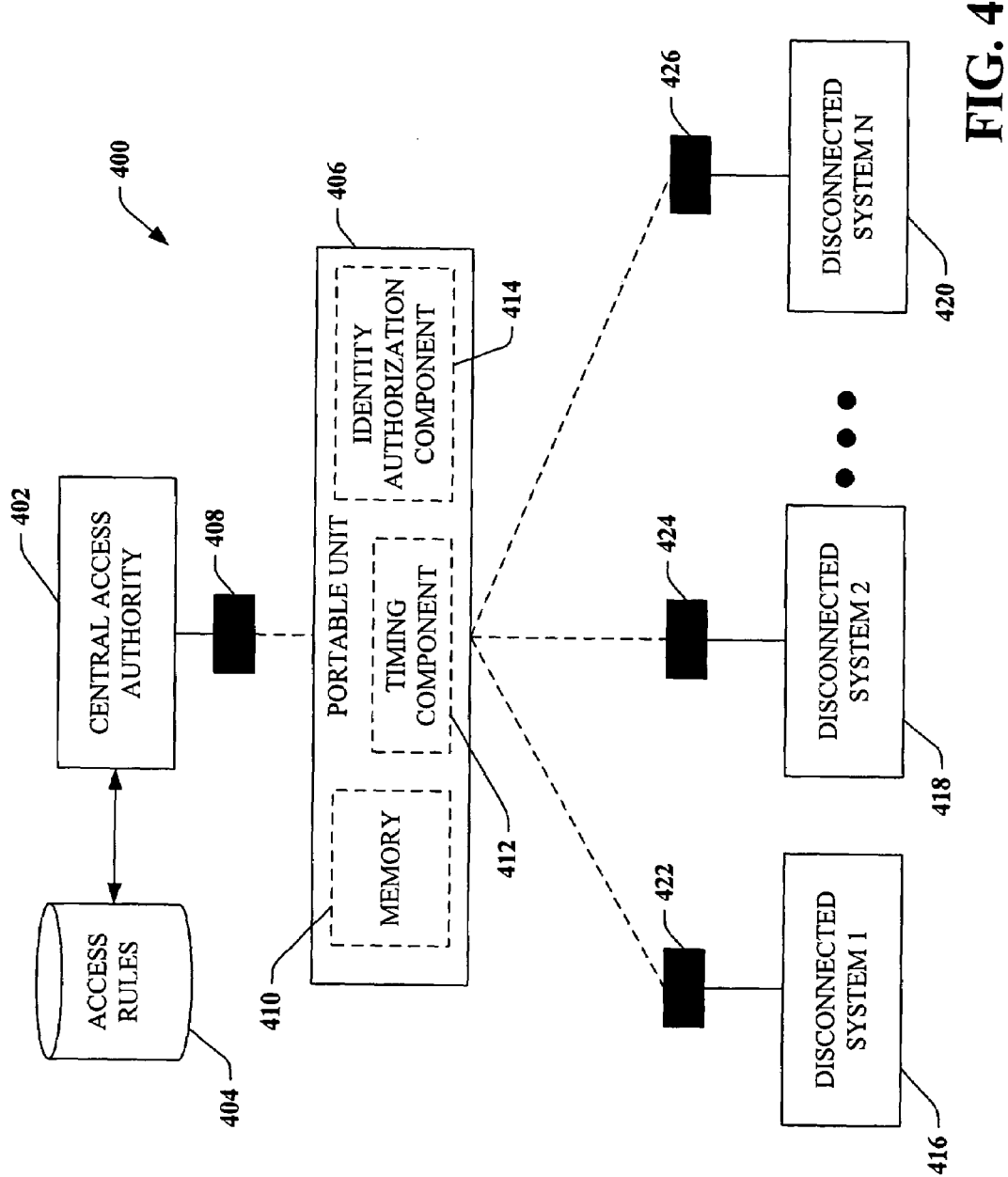
FIG. 4 is block diagram of a system that facilitates centrally providing access regulations relating to one or more disconnected systems/devices in accordance with an aspect of the subject invention.

Now turning to FIG. 4, a system 400 that facilitates centrally providing security to a plurality of disconnected systems in an industrial automation environment is illustrated. The system 400 includes a central access control authority 402 that provides access rights that can be employed in connection with accessing disconnected devices in an automation environment. For example, the central access control authority 402 can retrieve and/or store access rights from/to a data store 404. The central access control authority 402 provides the access rights to a portable unit 406. In accordance with one aspect of the subject invention, the central access control authority 402 can be associated with an access port 408, and the portable unit 406 can connect to such access port 408. For instance, the access port 408 can be a serial port, a USB port, a transmitter, or any other suitable component that can deliver access rights to the portable unit 406. Upon connection, the portable unit 406 caches the access rights to memory 410.

In accordance with another aspect of the subject invention, the portable unit 406 can include a timing component 412. In particular, the timing component 412 can include a tamper-resistant real-time clock that controls a timeframe in which the access rights cached in memory 410 are authorized. Further, the timing component 412 within the portable unit 406 can provide one or more disconnected systems with time information, thereby enabling a disconnected system to regulate access based upon time. Further, the portable unit 406 can be configured to automatically delete access rights from the memory 410 upon passage of a period of time. Such an embodiment can be useful in instances that the portable unit 406 is stolen or lost, as the access rights within the memory 410 can be automatically disabled upon a passage of time. Furthermore, the portable unit 406 can include an identity authorization component 414, where identity of an operator can be authenticated directly by such component 414 (rather than a disconnected device). For example, the portable unit 406 can include a user interface, such as a keypad and/or a pressure-sensitive screen to enable the user to enter a username, password, PIN, and the like. Further, the portable unit 406 can be equipped with technology that determines a user identity based upon biometric data, such as fingerprint, facial feature identification, retina scan, and the like.

The portable unit 406 can then be transferred and connected to one or more disconnected systems 416-420 through one or more access ports 422-426. For example, the access rights within memory 410 may provide access to the first disconnected system 416 and the Nth disconnected system 420 (where N is an integer), but not the second disconnected system 418. Therefore, when the portable unit 406 is connected to the first disconnected system 416 via the access port 422, an authenticated operator will be granted access to the disconnected system 416. However, if the portable unit is connected to the disconnected system 418 via the access port 424, access will not be granted to an operator associated with the portable unit 406, as the access rights within the memory 410 do not grant access to an operator of the portable unit 406. Similarly, access may not be granted to any of the systems 416-420 if an operator does not provide correct identity authentication information, even though the access rights grant privileges to such systems 416-420.

Furthermore, while not illustrated, the disconnected systems 416-420 can include a component that invalidates cached access rights for un-trusted users. For instance, the disconnected systems 416-420 can include a real-time clock that is employed in connection with analyzing validity of the cached access rights based upon time, wherein all cached rights expire after a particular time period. Further, a revocation list can be conveyed to a disconnected device via the portable unit 406. The disconnected systems 416-420 can also enforce sequences of access. In accordance with another aspect of the subject invention, the portable unit 406 can provide current access rights relating to a plurality of users of the system 400. Thus, the system 400 provides enhanced, centrally provided security mechanisms for utilization with respect to disconnected systems, which is a substantial improvement over conventional systems and/or methodologies for providing security to such disconnected systems.

Figure 5:
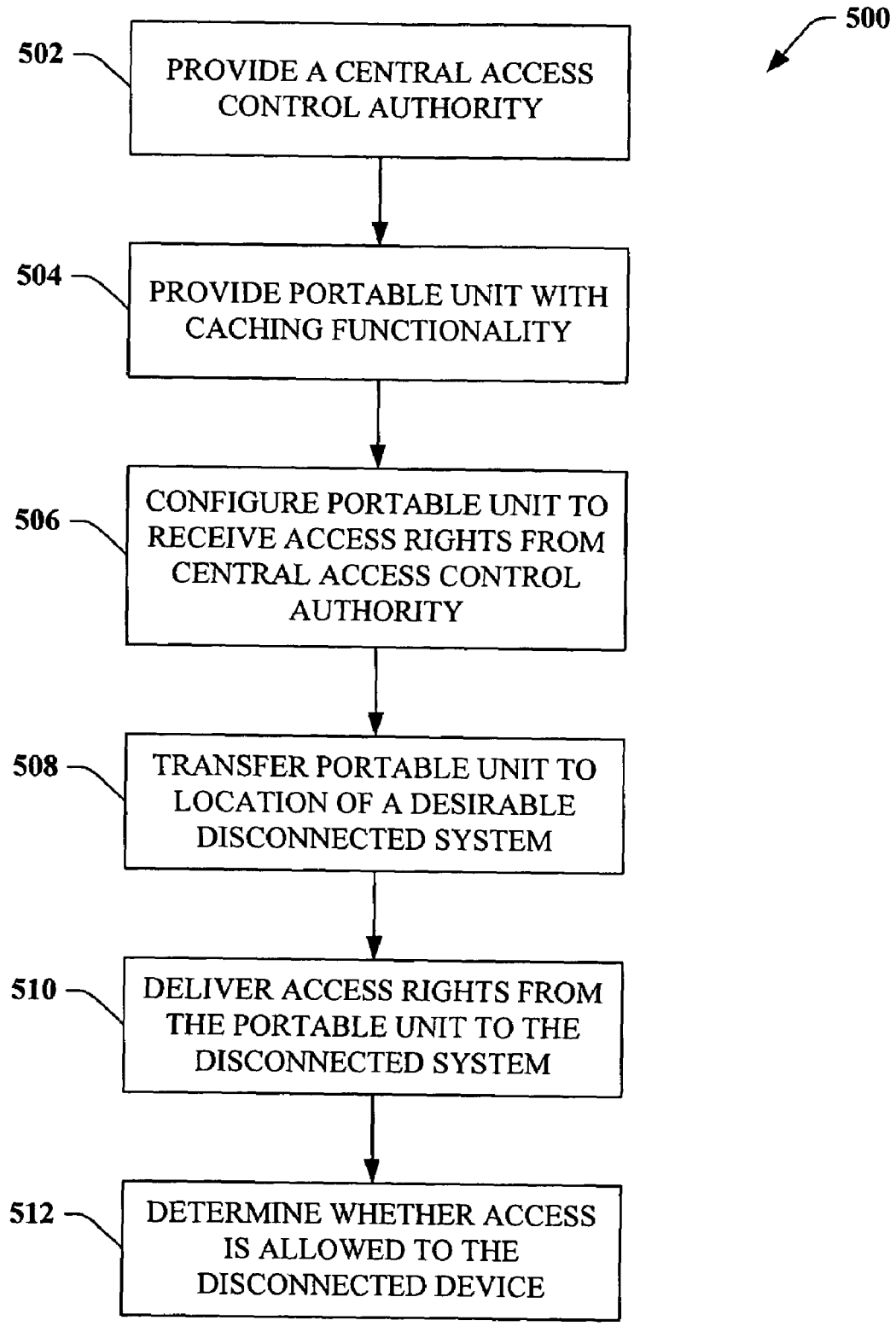
FIG. 5 is a representative flow diagram illustrating a methodology for centrally providing access regulations to a disconnected system in accordance with an aspect of the subject invention.

Turning now to FIG. 5, a methodology 500 for centrally administering access regulations relating to one or more disconnected devices within an industrial automation environment is illustrated. While, for purposes of simplicity of explanation, the methodology 500 is shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 502, a central access control authority is provided. The central access control authority provides security rights and regulations relating to a plurality of disconnected systems. For example, the central access control authority can provide access rights relating to a particular user, timeframe, system, etc. In accordance with one aspect of the subject invention, the central access control authority can be associated with and/or employ a Certificate Authority, PGP, generate access documents in form of a PKI document and/or Kerberos ticket, or the like.

At 504, a portable unit with caching functionality is provided. For example, the portable unit can be a Smart Card with onboard processing capabilities, a PDA, a cell phone, a laptop, a disk, a card with a magnetic strip, or any other suitable portable device that can cache access rights. At 506 the portable unit is configured to receive access rights from the central access control authority. For instance, the portable unit can be physically connected to the central access control authority through access ports (e.g., a USB port or the like). Similarly, the portable unit can be positioned proximate to the central access control authority and receive access rights over a wireless link, an infrared link, or other suitable data transfer methods. In a disparate embodiment, the portable unit can be located remotely from the central access control authority, and is configured to receive access rights over a network. For example, a laptop computer at a first geographic location can be configured to access a local Internet, and access rights can be passed over such local Internet to the laptop computer from the central access control authority at a disparate geographic location. Similarly, a cellular phone can receive access rights over a cellular network provided adequate encryption and network security for a given application. Such transfer can be secure from tampering by the operator or external source through a combination of network security or transfer protocol security.

At 508, the portable unit is transported to a location of a disconnected system to which access is desired. For instance, the disconnected system can be a batch machine, a vending machine, a roller coaster, a ski lift, or any other system/device that can be disconnected from a centrally governed automation system. At 510, access rights cached within the portable unit are delivered to the disconnected system. These access rights can be passed over a physical connection and/or a wireless connection as described above. Further, prior to accepting access rights, the disconnected system may require proof of identity from an operator. Such proof can be entered into the portable unit if such portable unit is trusted, or the disconnected system can require the operator to enter identity authentication information into the disconnected device (e.g., PIN, password, biometric information, . . . ).

At 512, a determination is made regarding whether access is permitted to the disconnected device. For example, if the access rights include evidence of tampering, the disconnected system may not allow a requesting operator access to such system. Further, if it is determined that the access rights have expired and/or do not originate form the central access control authority, access to such disconnected device may not be permitted. Further, the access rights can limit access to allow for particular task or maintenance, but disallow access to sensitive portions of the disconnected system/device. Therefore, the methodology 500 allows a central system to administer security to one or more disconnected devices, in contrast to conventional systems that require a technician to visit each disconnected device and modify access rights when such modification is necessary/desirable.

Figure 6:
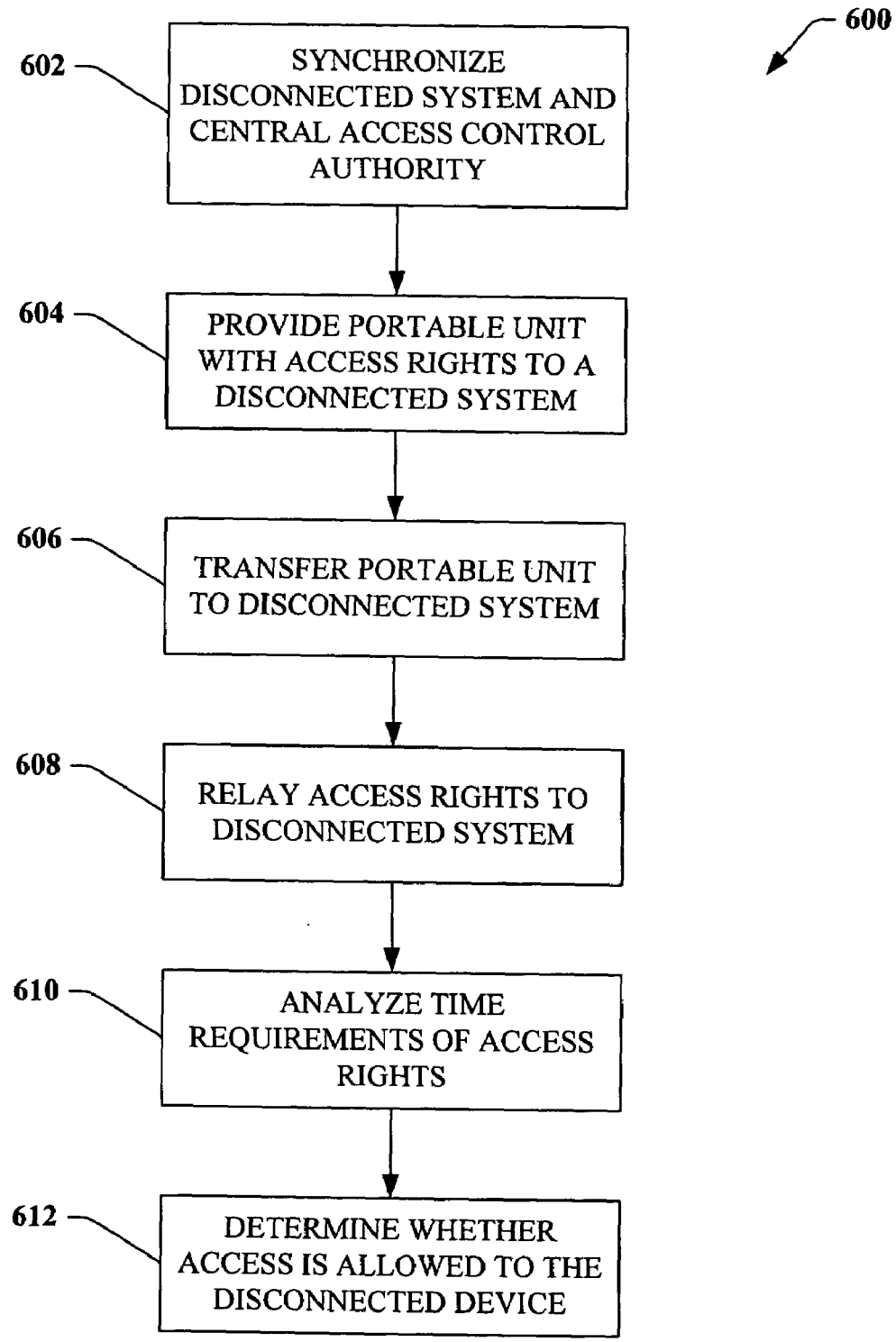
FIG. 6 is a representative flow diagram illustrating a methodology for providing a timeframe of access with respect to a disconnected system in accordance with an aspect of the subject invention.

Turning now to FIG. 6, a methodology 600 for providing access rights from a central system to a disconnected system/device is illustrated. At 602, a disconnected system and a central access control authority are synchronized. For instance, the disconnected system and the central access control authority can be temporarily networked to synchronize internal clocking devices. In a disparate example, a portable device can include a clock component and capture a time of the central access control authority during an instance that such portable device is in communication therewith. Thereafter the portable device can be connected to the disconnected system, which similarly includes a clock component, and relay the time of the central access control authority.

At 604, a portable unit is provided with access rights to one or more disconnected systems. In accordance with the invention, the access rights are provided from a central access control authority, and the portable unit includes sufficient memory to cache such access rights. At 606, the portable unit is physically transferred to the disconnected system where access is desired by an operator utilizing the portable unit. At 608, the access rights are relayed from the portable unit to the disconnected system. The access rights can be relayed via essentially any suitable communications link. Physical proximity can be required, as it is undesirable to open access to a disconnected device when the operator requesting such access is not near.

At 610, time requirements within the access rights are analyzed by the disconnected system. For instance, often it is desirable to limit a time of access to an operator to a limited timeframe, particularly for tasks that only require a specific amount of time for completion. As the central access control authority is synchronized with the disconnected system, the access rights can limit access to the disconnected device to a limited time. The disconnected system can thus analyze the timeframe for access and determine whether the access request falls within the given timeframe. If the access request does not fall within the appropriate timeframe, access to the disconnected system is denied. If the operator desires further access, such operator can return to the central access control authority and attempt to receive updated access rights with a new timeframe. At 612, a determination is made regarding whether an operator associated with the portable unit is allowed access to the disconnected device. For example, if the access rights specify a time range, and the request for access is outside the timeframe, access to the disconnected device is denied. Further, if an operator cannot authenticate his identification, if the contents of the access rights have been subject to tampering, if the access rights do not originate from the central access control authority, and the like, access to the disconnected device will be prevented. If, however, the access rights are valid and other specified parameters are met, access to the disconnected device is provided to the user.

Figure 7:
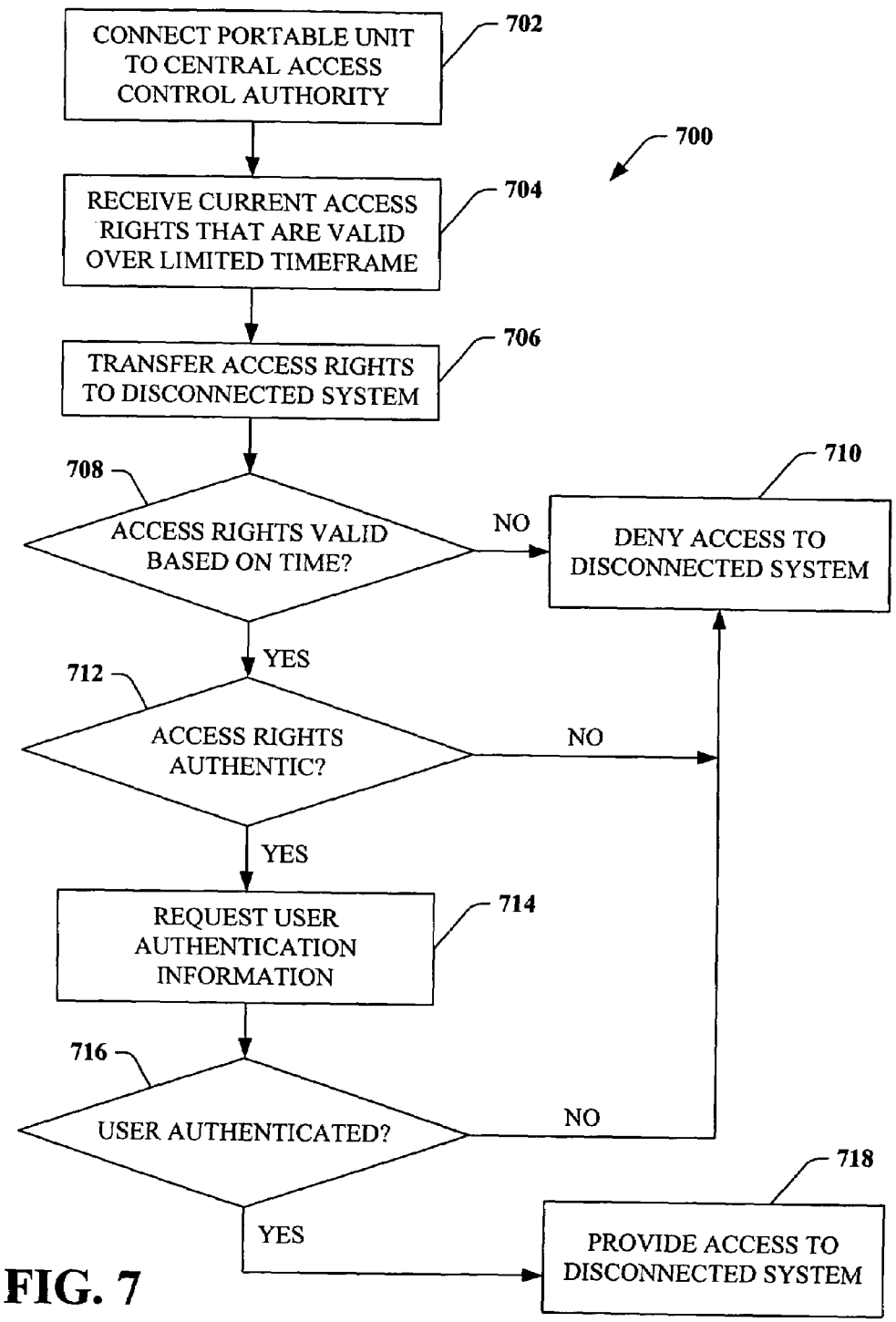
FIG. 7 is a representative flow diagram illustrating a methodology for analyzing centrally provided access rights in accordance with an aspect of the subject invention.

Now turning to FIG. 7, a methodology 700 for determining whether access should be allowed to a disconnected system based upon access rights provided by a central access control authority is illustrated. At 702, a portable unit is connected to a central access control authority, wherein such connection can be over a substantial geographic distance, can be wireless, wire-lined, through access ports, or any other suitable connection. At 704, current access rights that are valid over a limited timeframe are received. For example, timestamps or similar documentation can be employed to provide a timeframe for access within the access rights. In a disparate embodiment, the portable unit includes a timing mechanism, wherein such mechanism is initiated upon receipt of the access rights from the central access control authority. Therefore, the access rights are valid for a specified timeframe, and can be automatically erased from the portable unit upon passage of such timeframe.

At 706, the access rights are transferred to the disconnected system to which access is desired (e.g., the rights can be transferred through access ports, wirelessly, . . . ). At 708, the disconnected system determines whether the access rights are valid based upon the specified timeframe. For instance, the disconnected system can include a processing component that can analyze the timeframe encoded within the access rights, and make a determination regarding whether the access request lies within the encoded timeframe. If the access rights are not valid based upon time, then at 710 access to the disconnected system is denied. If the access request was provided within a required timeframe, at 712 a determination is made regarding whether the access rights are authentic. For one particular example, the disconnected system can analyze contents of the access rights and determine whether such contents have been altered or compromised based upon an encryption scheme. In another example, the access rights can include data indicating that such rights originated from the central access control authority. The disconnected system can analyze such data and determine whether such origination data exists. If the access rights are found not to be authentic, then access is denied to the disconnected system at 710.

At 714, the disconnected system and/or the portable unit can request user authentication information. For instance, the access rights can include data indicating the owner of the access rights, and further include data that should be employed in connection with prompting an operator. More particularly, the access rights can include a PIN number or the like, wherein the operator must have knowledge of the PIN prior to obtaining access to the disconnected device. In another specific example, the operator can be prompted for biometric data, a password, a voice sample, or any other suitable mechanism that can be employed to determine that the operator requesting access is an authorized operator. At 716, a determination is made regarding whether the user has been authenticated. For example, the user's proffered PIN may be required to match a PIN encoded within the access rights. If the user is not authenticated, then access is denied to the disconnected system at 710. If the user is authenticated, then the user is provided access to the disconnected system at 718.

Figure 8:
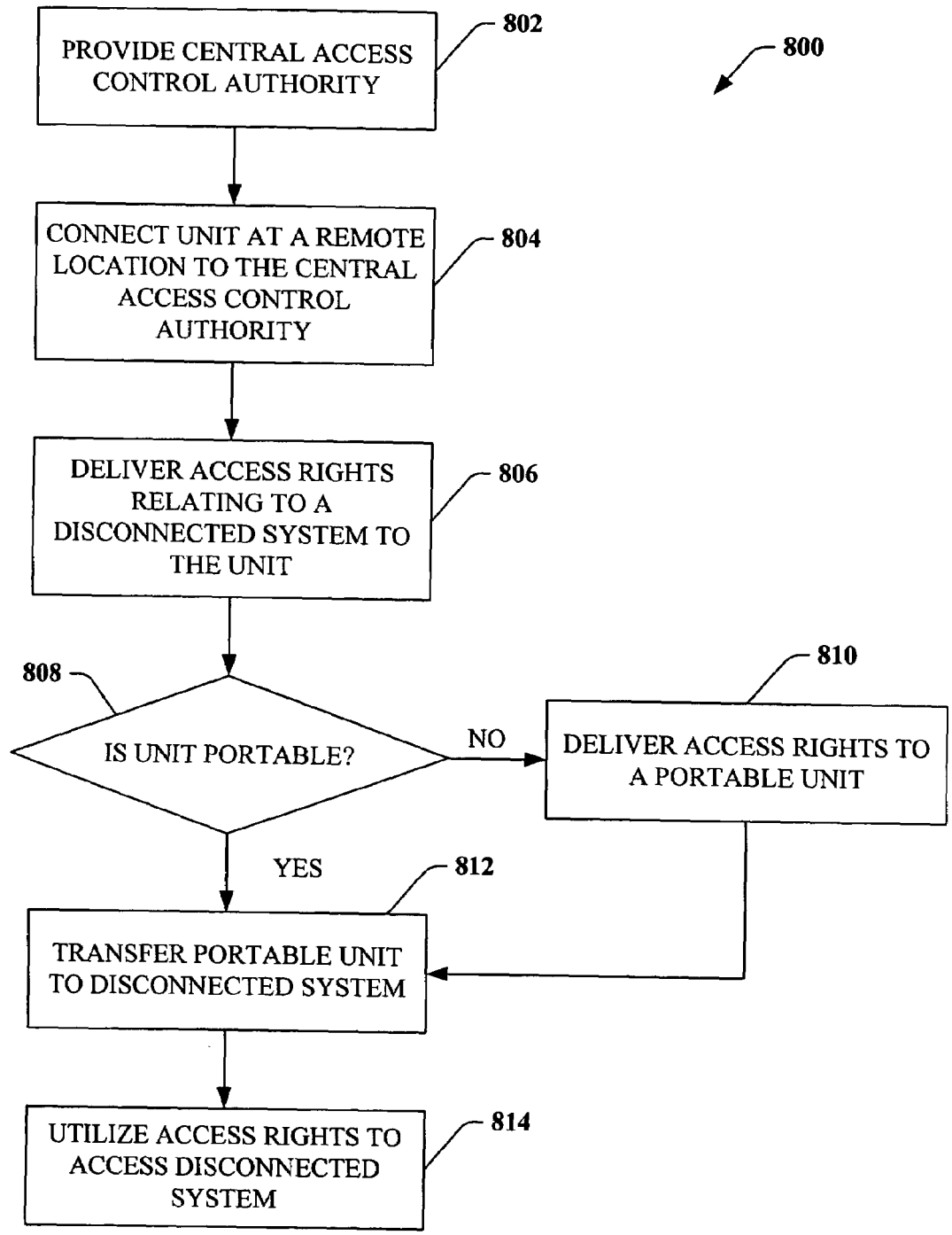
FIG. 8 is a representative flow diagram illustrating a methodology for providing access rules to a portable unit in accordance with an aspect of the subject invention.

Now referring to FIG. 8, a methodology 800 for providing access rights to a disconnected system from a central administration component is illustrated. At 802, central access control authority is provided. At 804, a unit is connected to the central access control authority, wherein the unit is at a remote location when compared to a location of the central access control authority. For a particular example, the central access control authority can be in a first city, and the unit can be in a second city. At 806, access rights relating to a disconnected system are delivered over a network from the central access control authority to the unit. This transfer can be secure from tampering by the operator or external source through a combination of network security or transfer protocol security. Conventional network protocols can be employed to ensure integrity of the access rights during transmission.

At 808, a determination is made regarding whether the unit is portable. For example, the unit can be a desktop PC, and is therefore not portable. If the unit is not portable, at 810 the access rights are transferred to a portable unit, such as a Smart Card, a disk, a laptop, a PDA, a cell phone, or some other suitable device that can connect to the non-portable unit. If the unit is portable or the access rights have been delivered to a portable unit, at 812 the portable unit is physically transported proximate to a disconnected system. Thereafter at 814, the access rights are utilized to access the disconnected system, so long as such access rights are valid (e.g., the access rights are not time-precluded, are authentic, . . . ).

Figure 9:
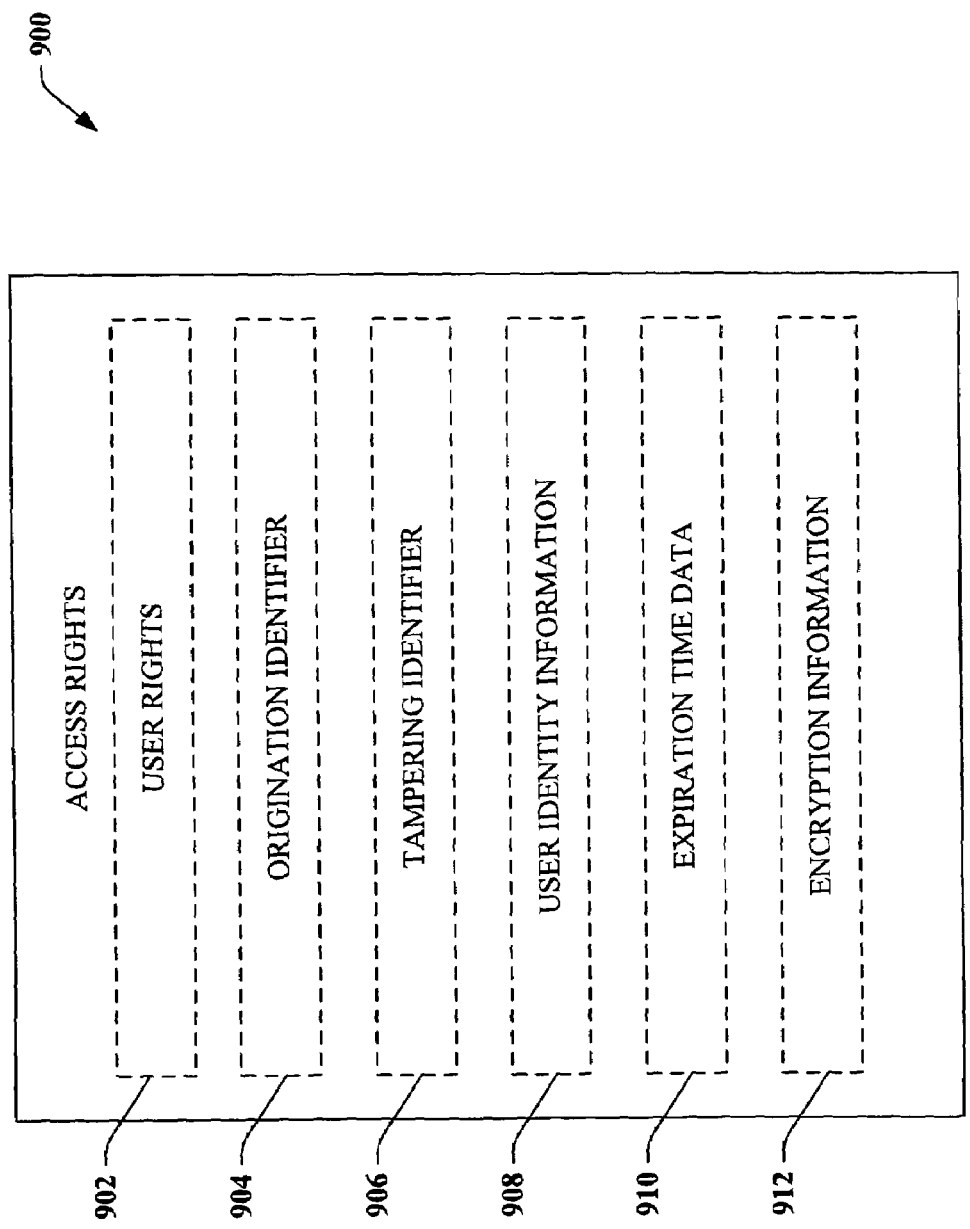
FIG. 9 is an exemplary data structure that can be utilized in accordance with an aspect of the subject invention.

Turning now to FIG. 9, an exemplary abstraction of a data structure and/or certificate 900 that is employed in connection with carrying access rights related to a disconnected system in accordance with the subject invention is illustrated. In accordance with one aspect of the subject invention, the data structure is a machine-readable structured document protected by conventional security formats. The data structure 900 includes user rights 902 with respect to a disconnected system. For example, a user can be granted only particular rights to the disconnected system, and such rights are specified within the data structure 900. Also included is an origination identifier 904, which indicates a system and/or location from which the data structure 900 was generated. Typically, for a disconnected system to allow access to an operator, the origination identifier 904 should identify a central access control authority as a generator of the data structure.

The data structure 900 further includes a tampering identifier 906 that can be analyzed by a disconnected system to determine whether the data structure has been subject to tampering. For instance, the tampering identifier 906 can be data placed in a position known only to the disconnected system and the central access authority. Alterations to such data would indicate that the access rights have been subject to tampering, and access to a disconnected system can be denied based upon such indication. User identity information 908 can also be encoded into the data structure, wherein such information can include a password, PIN, biometric indicia, and any other suitable information that can be employed to identify a user. For example, a disconnected system can receive the data structure 900 and prompt a user based upon information within the user identify information 908.

The data structure 900 can also include expiration time data 910, where a user is allowed to access a disconnected system within a limited time frame. If a central access control authority and a disconnected system are synchronized, the expiration time data can include a time where access is no longer allowed (and optionally a start-time of allowed access). Further, the expiration time data can relate to a sequence of access required by the disconnected system, which would facilitate one-time access privileges. In accordance with another aspect of the subject invention, a portable unit carrying the data structure can include a clocking mechanism that receives a time of allowed access from a central access control authority and simply "counts down" from that received time. Moreover, encryption information 912 can be encoded within the data structure 900. For example, contents of the data structure can be encrypted, and the encryption information 912 can include keys that allow a disconnected device to decrypt such information.

Figure 10:
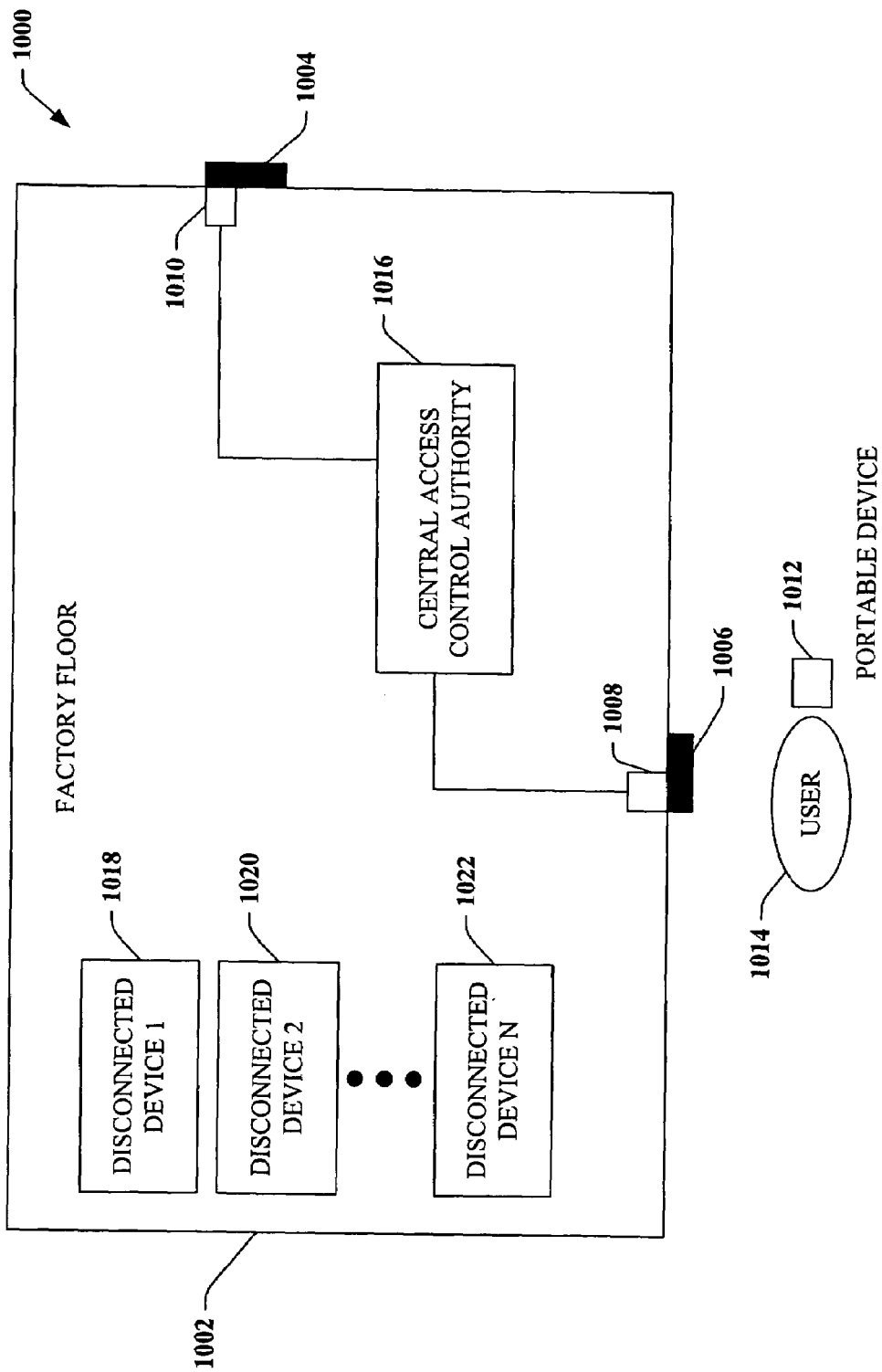
FIG. 10 is an exemplary implementation of a system that provides access privileges relating to disconnected systems in accordance with an aspect of the subject invention.

Now turning to FIG. 10, an exemplary implementation 1000 of the subject invention is illustrated. A factory floor 1002 includes two disparate entries 1004 and 1006 in which employees, invitees, and the like can enter. Near the entries 1002 and 1004 can be access-enabling mechanisms 1008 and 1010. For instance, these access mechanisms 1008 and 1010 can be coupled to a security gate or the like, wherein passing information between a portable device 1012 and the access-enabling mechanisms 1008 and 1010 is required prior to opening such gate. More particularly, the portable device 1012 can be a Smart Card that includes information relating to a user 1014, and such information can be received and analyzed by the access-enabling mechanisms 1008 and 1010. If such user-related information is authenticated, access to the factory floor 1002 can be provided to the user 1014.

The access-enabling mechanisms 1008 and 1010 are further coupled to a central access control authority 1016, which centrally administers security procedures relating to devices upon the factory floor 1002. For example, the central access control authority 1016 can relay information to the access-enabling mechanisms regarding who can be provided access to the factory floor 1002. The central access control authority 1016 can further provide access information relating to a plurality of disconnected devices 1018-1022 on the factory floor 1002. The access-enabling mechanisms 1008-1010 can then transfer these access regulations to users as they enter the factory floor 1002. Note that the access control authority 1016 need not be within the bounds of the factory floor 1002, only able to communicate with access-enabling mechanisms 1008 and 1010.

For a specific example, the user 1014 desires access to the factory floor 1002, and accordingly connects the portable device 1012 to the access-enabling mechanism 1008, wherein the term "connects" includes any suitable communicative coupling. As the access-enabling mechanism 1008 is determining whether the user 1014 is to be allowed access to the factory floor 1002, such mechanism 1008 is providing the portable device 1012 with access information relating to one or more of the disconnected devices 1018-1022, wherein the access information is issued by the central access control authority 1016. For instance, the access information can include user identity, specific access privileges, allowable timeframe for access, etc. Therefore, if the user 1014 is authorized to enter the factory floor, the portable device 1012 is updated with access rights for the disconnected devices 1018-1022. Thereafter, the user 1014 can transfer the portable device 1012 to one or more of the disconnected devices 1018-

1022, and access such device(s) 1018-1022 according to the access rights cached within the portable device 1012. Thus, access rights relating to the user 1014 can be automatically updated each time the user 1014 passes the access-enabling mechanism 1008. Further, access rights need only be altered within the central access control authority 1016 if the user 1014 changes position, retires, etc., rather than having to update access rights at each of the disconnected devices 1018-1022. It is important to note that the factory floor 1002 is only one example of a surrounding physical access restriction for the disconnected devices 1018-1022. Another example is an electronically locked cabinet where for example only a portion of the operator enters the interior space and the portable device 1012 may access the disconnected devices without entering the interior space, for example, through wireless means.

In accordance with yet another aspect of the subject invention, the user 1014 can operate as the portable device 1012. More specifically, at the entrance 1006, the user can be provided with access codes to one or more of the disconnected devices 1018-1022. These codes can specify or encode user access rights with respect to one or more of the disconnected devices 1018-1022, as well as specify that the access codes originated from the central access control authority 1016 (which is trusted by the disconnected devices 1018-1022). Further, it is desirable that the access codes be verifiable against tampering, and that a user identity be challenged based upon the access codes. Moreover, the access codes can be verified for validity within a timeframe, and the contents relating to access can be private. For example, the access codes or other information provided to the user 1014 from the central access control authority 1016 can be entered into one or more of the disconnected devices 1018-1022 via a keypad, mouse, or any other suitable user interface.

Figure 11:
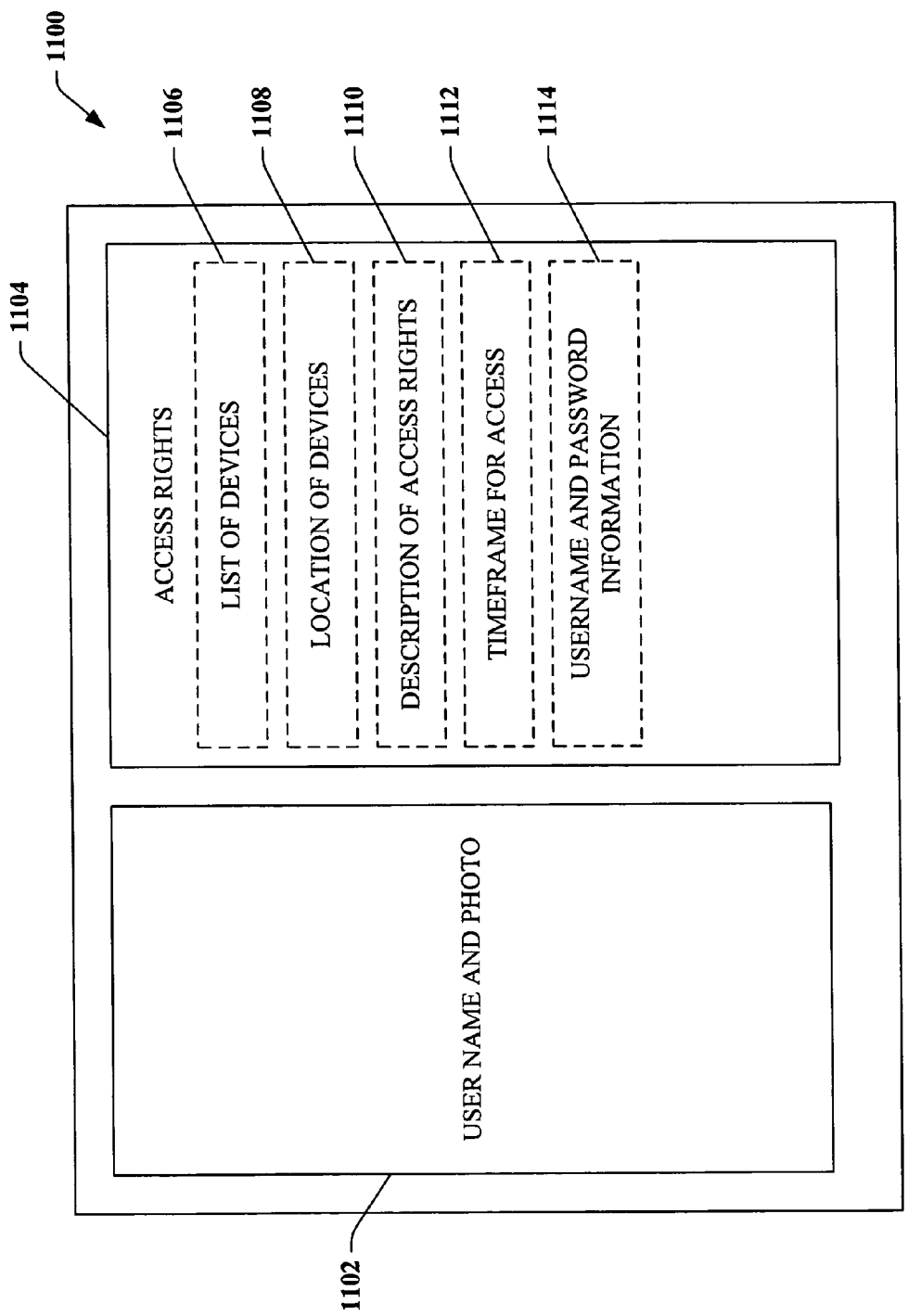
FIG. 11 is an exemplary is an exemplary graphical user interface that can be employed in accordance with an aspect of the subject invention.

Now referring to FIG. 11, an exemplary graphical user interface 1100 that can be employed in connection with the subject invention is illustrated. For example, the interface 1100 can be provided to a user at a time access rights to one or more disconnected device(s) are received, thus providing the user with knowledge of which devices they can access. In another embodiment, if the user (rather than a portable device) acts as a cache for access rights administered by a central access control authority, the interface 1100 can provide the user with access codes and the like that are utilized in connection with obtaining access to one or more disconnected devices.

The interface 1100 includes a user name and photograph region 1102. Such a visual display provides a layer of security, as users proximate to the graphical user interface may find that the user shown in the user name and photograph region 1102 is not the user who is attempting to obtain access rights. The interface 1100 further includes an access rights region 1104 that describes/defines access rights relating to disconnected device(s) with respect to the user. Particularly, the access rights region 1104 can include a list of devices region 1106, wherein particular disconnected device(s) to which the user has access is provided. A location of devices region 1108 can also be provided to direct the user to devices to which such user has access. The access rights region 1104 can further include a description of access rights region 1110, which describes particular tasks the user can undertake with respect to disparate disconnected devices. Moreover, a timeframe for access region 1112 is provided to notify the user of a timeframe to which access is allowed given the current access rights. Finally, username and password information 1114 can be presented to the user, thereby allowing the user to authenticate his identification when prompted by a disconnected device.

Figure 12:
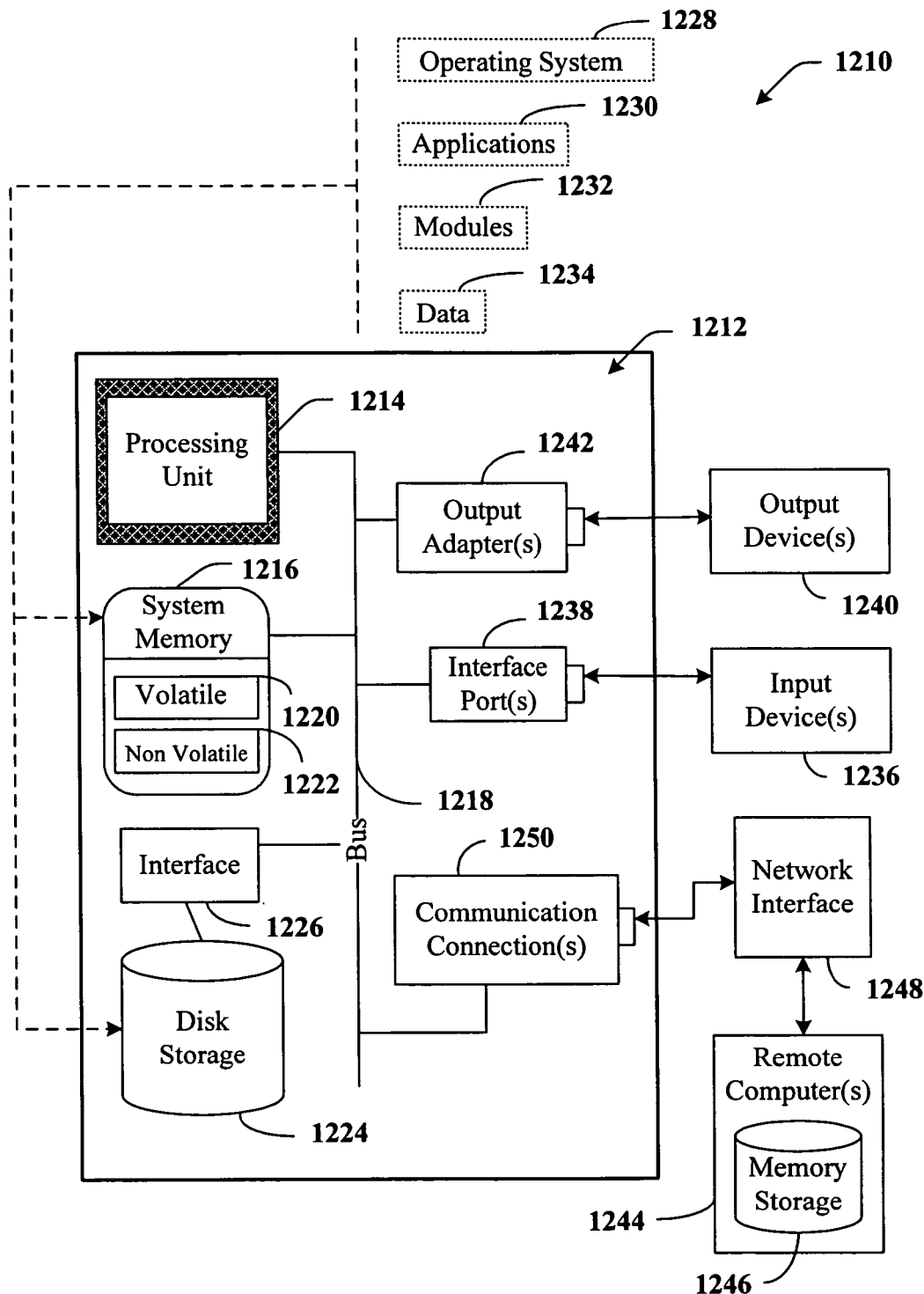
FIG. 12 is an exemplary operating environment that can be employed in connection with the subject invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses, communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
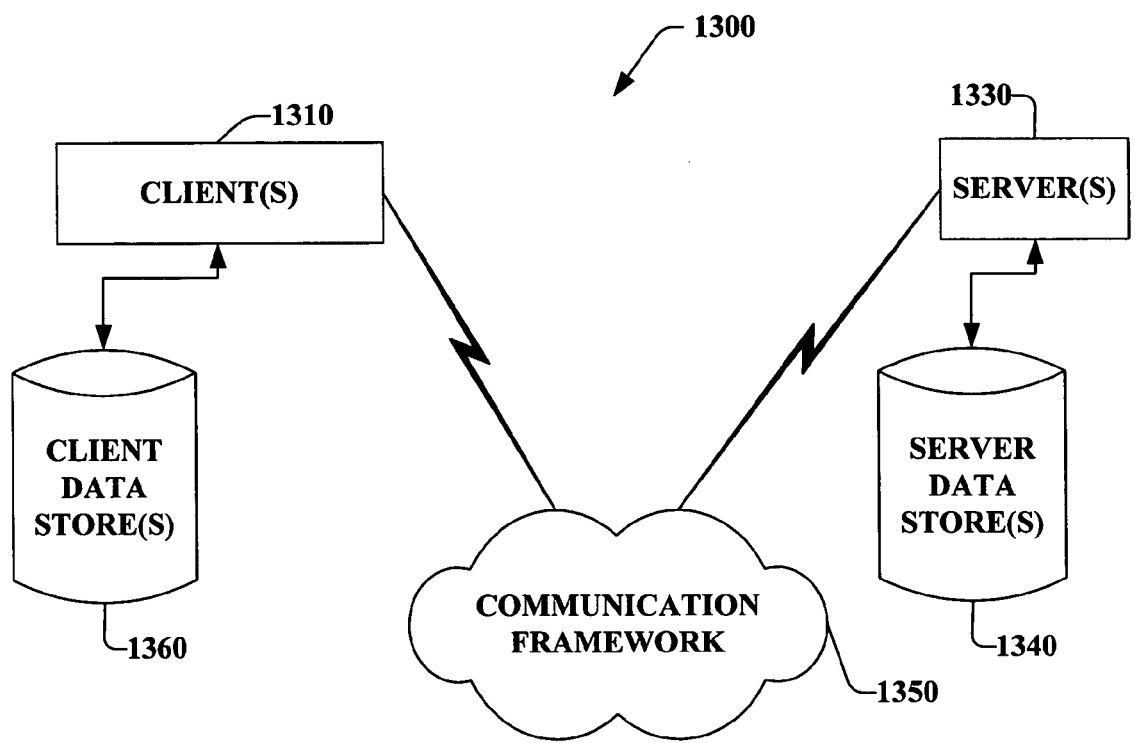
FIG. 13 is an exemplary operating environment that can be employed in connection with the subject invention.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A security system for one or more disconnected automation devices, comprising:
    a central access control authority that provides one or more access regulations for one or more automation devices, wherein the one or more automation devices are remote from the central access control authority; and
    a portable unit that connects to the central access control authority, receives the one or more access regulations from the central access control authority, caches the one or more access regulations in memory, controls a timeframe for which the one or more access regulations are valid, transfers the one or more access regulations to the one or more automation devices, and deletes the one or more access regulations from memory upon expiration of the timeframe for which the one or more access regulations are valid
    wherein the one or more automation devices receive the one or more access regulations from the portable unit and grant a level of access to the one or more automation devices based at least in part upon the one or more access regulations.

2. The security system of claim 1, the portable unit is one or more of a smart card, a PDA, a laptop computer, or a cellular phone.

3. The system of claim 1, the one or more automation devices authenticate a user according to the one or more access regulations.

4. The system of claim 3, wherein the one or more automation devices request a user name and password to authenticate the user.

5. The system of claim 3, wherein the one or more automation devices utilize biometric techniques to authenticate the user.

6. The system of claim 1, the one or more automation devices verify that the one or more access regulations originate from the central access control authority.

7. The system of claim 1, the one or more automation devices determine whether a limited time for which the one or more access regulations are valid has expired.

8. The system of claim 1, the portable unit receives a time from the central access control authority and synchronizes the one or more automation devices with the central access control authority by informing the one or more automation devices of the time of the central access control authority.

9. The system of claim 1, the central control authority further provides one or more operating instructions the portable unit and the portable unit transfers the one or more operating instructions to the one or more automation devices.

10. The system of claim 1, the one or more automation devices transfers data to the portable unit.

11. The system of claim 10, the transferred data is audit information.

12. The system of claim 1, the central access control authority is a distributed system that acts as a single system.

13. The system of claim 1, the portable unit connects to the central access authority over a network.

14. The system of claim 1, the one or more access regulations are carried in a data structure or a certificate.

15. The system of claim 1, the one or more automation devices determine whether the portable unit has been subject to tampering.

16. The system of claim 1, the one or more access regulations allow one-time access to the one or more disconnected automation devices.

17. The system of claim 1, the portable unit includes a clocking mechanism that is employed in connection with enforcing a timeframe of access to the one or more automation devices.

18. The system of claim 1, the one or more access regulations comprise information utilized to enforce a sequence of access to the one or more automation devices.

19. The system of claim 1, the one or more access regulations are structured as one or more of a public key infrastructure certificate or a Kerberos ticket.

20. The system of claim 1, the central access control authority employs one or more of a Certificate Authority or a Pretty-Good-Privacy program.

21. The system of claim 1, the one or more access regulations are encrypted with one or more cryptographic keys that are passed to the one or more automation devices.

22. The system of claim 21, the one or more cryptographic keys enable the one or more automation devices to recognize the one or more access regulations.

23. The system of claim 22, the one or more automations devices employ a hashing algorithm to decrypt the access regulations.

24. The system of claim 22, the hashing algorithm being is at least one of message-digest algorithm 5 ("MD5"), secure hash algorithm 1 ("SHA-1"), or Research and Development in Communications Technologies in Europe integrity primitives evaluation message digest ("RIPEMD-160".

25. A method for centrally providing access to one or more disconnected devices in an industrial automation environment, comprising:
providing one or more access rights relating to one or more disconnected devices and a time to a portable unit from a central access control authority, wherein the one or more access rights are encoded with a timeframe for which the one or more access rights are valid;
bringing the portable unit into proximity with the one or more disconnected devices;
transferring the one or more access rights and the time from the portable unit to the one or more disconnected devices;
receiving a request to access the one or more disconnected devices;
determining whether the one or more access rights are authentic, comprising:
analyzing an encryption scheme of the one or more access rights; and
determining whether the encryption scheme has been altered; and
determining whether the request to access lies within the timeframe encoded in the one or more access rights in which the one or more access rights are valid based at least in part upon the time.

26. The method of claim 25, determining whether the one or more access rights are authentic further comprises: analyzing data from the one or more access rights and determining whether the data includes an indication of an origination of the one or more access rights.

27. The method of claim 25, further comprising transferring the access rights to the portable unit over a network.

28. The method of claim 25, receiving the one or more access rights comprises caching one or more cryptographic keys within the portable unit.

29. A security system, comprising:
a portable unit, comprising:
a memory that caches one or more access regulations for at least one disconnected system from a central access control authority; and
a timing component that controls a timeframe in which the one or more access regulations cached in memory are valid, wherein the portable unit deletes the one or more access regulations from memory upon expiration of the timeframe for which the one or more access regulations are valid.

30. The system of claim 29, the portable unit transfers the one or more access regulations to the at least one disconnected system when the portable unit is in close physical proximity to the at least one disconnected system.

31. The system of claim 29, the timing component comprises a real-time clock and the timeframe is based upon the real-time clock.

32. The system of claim 29, the timing component provides the at least one disconnected system with time information, wherein the at least one disconnected system regulates access based at least in part upon the time information.

33. The system of claim 29, the portable unit further comprises an identity authorization component that verifies an identity of an operator and grants access to the at least one distributed system based upon the identity of the operator and the one or more access rights.

34. The system of claim 29, the portable unit receives an indication that the one or more access rights are invalid from the at least one disconnected system and deletes the invalid one or more access rights from the memory.

* * * * *